(12) United States Patent
Sasaki et al.

(10) Patent No.: US 6,665,579 B2
(45) Date of Patent: Dec. 16, 2003

(54) CONTROL METHOD FOR BAR MATERIAL FEEDER OF NC LATHE AND NC LATHE

(75) Inventors: Yasuhiro Sasaki, Hidaka (JP); Tadashi Fujinawa, Sakado (JP)

(73) Assignee: Citizen Watch Co., Ltd., Nishitokyo (JP)

(*) Notice: Subject to any disclaimer, the term of this patent is extended or adjusted under 35 U.S.C. 154(b) by 36 days.

(21) Appl. No.: 10/148,632

(22) PCT Filed: Oct. 11, 2001

(86) PCT No.: PCT/JP01/08939

§ 371 (c)(1),
(2), (4) Date: Jun. 4, 2002

(87) PCT Pub. No.: WO02/34439

PCT Pub. Date: Feb. 5, 2002

(65) Prior Publication Data

US 2002/0183888 A1 Dec. 5, 2002

(30) Foreign Application Priority Data

Oct. 26, 2000 (JP) .................................. 2000-327803

(51) Int. Cl.$^7$ .............................................. G06F 19/00
(52) U.S. Cl. .................... 700/159; 82/127; 29/27 C
(58) Field of Search .......................... 279/126; 700/159, 700/190; 82/127, 117, 1.11; 29/27 C

(56) References Cited

U.S. PATENT DOCUMENTS 3,710,466 A * 1/1973 Williamson et al. ........ 29/27 R
4,250,775 A * 2/1981 Jerue et al. .................. 82/1.11
4,949,443 A * 8/1990 Saruwatari et al. .......... 29/27 C
5,127,140 A * 7/1992 Oiwa et al. .................. 29/27 C
6,139,028 A * 10/2000 Kosho ........................ 279/114
6,463,835 B1 * 10/2002 Segawa et al. .............. 82/1.11

FOREIGN PATENT DOCUMENTS

| JP | 04-315502 | 11/1992 |
| JP | 05-042441 | 2/1993 |
| JP | 05-192801 | 8/1993 |
| JP | 07-075901 | 3/1995 |
| JP | 07-106483 | 11/1995 |
| JP | 09-019803 | 1/1997 |
| JP | 09-216102 | 8/1997 |
| JP | 11-254202 | 9/1999 |

* cited by examiner

Primary Examiner—Albert W. Paladini
Assistant Examiner—Michael D. Masinick
(74) Attorney, Agent, or Firm—Kanesaka & Takeuchi

(57) ABSTRACT

Provided is a method of controlling a bar supplying apparatus capable of automatically setting a timing of opening a run-out preventing chuck, a timing of cutting a bar short, and a timing of replacing the bar by the minimum input work.

A controller 115 of an NC lathe 110 extracts length data (1) of a product and dimensional data (s) of a cutting width from a machining program, calculates the position of a feeder 123 on the basis of those data, and controls supply of a bar W to bar supporting units 128a to 128c, opening/closing of run-out preventing chucks 129a to 129d, and feeding and replacement of the bar W on the basis of the position of the feeder 123.

13 Claims, 12 Drawing Sheets

130

| Bar Supplying Apparatus Set | |
|---|---|
| Bar Supplying Apparatus Position (A7 Shaft Base Coordinates) | 0.000 mm |

| ☐ Torque At The Time Of Feed  18 % | ☐ Open Position Of Clamping 1  1323.000 mm |
| | ☐ Open Position Of Shutter 1  1661.000 mm |
| ⦿ In Case Lengths Of Shelf Materials Are Uniform<br>☐ Short Cut Position  33.000 mm | ☐ Open Position Of Clamping 2  1823.000 mm |
| | ☐ Open Position Of Shutter 2  2521.000 mm |
| ○ In Case Lengths Of Shelf Materials Are Not Uniform<br>☐ Short Cut Position  0.000 mm | ☐ Open Position Of Clamping 3  2823.000 mm |
| | ☐ Open Position Of Shutter 3  3371.000 mm |
| ☐ Material Exchange Position  2000.000 mm<br>☐ Length Of Material  2500.000 mm | Product Length + Width Of Cutting-Off Tool  103.000 mm |
| Number Of Products To Be Produced From Remaining Material   About [   ] Pieces | Number Of Necessary Products  [   ] Pieces |
| Remaining Processing Time  About ☐ Hours ☐ Minutes | Number Of Bars To Be Used For Production  [   ] Pieces |
| Present Bar Material Remaining Length  About [   ] mm | Remaining Length Of Final Bar  [   ] mm |
| Remaining Material Length  About [   ] mm | Number Of Products To Be Machined From Final Bar  [   ] Pieces |
| Data Set | Material Feeding Torque When Main Chuck Is Opened. | Close |

FIG.4

CONTROL METHOD FOR BAR MATERIAL FEEDER OF NC LATHE AND NC LATHE

TECHNICAL FIELD

The present invention relates to a method of controlling a bar supplying apparatus provided for a numerically controlled lathe, for continuously machining products while feeding a long bar on a predetermined length unit basis through a through hole in a main spindle.

BACKGROUND ART

A bar supplying apparatus for supplying a long bar through a through hole formed on the axis of a main spindle of a numerically controlled lathe (hereinbelow, described as NC lathe) is known. The bar supplying apparatus can continuously machine a plurality of products from a single bar by repeating a process of allowing the tip of the bar project by a predetermined length from a guide bush provided on the axis or in front of the main spindle, machining the tip of the bar with a tool attached to a tool post, cutting off a product from the tip of the bar by a cutting-off tool, feeding the bar by a predetermined length, and similarly machining the tip of the bar.

FIG. 9 shows the configuration of a conventional NC lathe having such a bar supplying apparatus.

As shown in the diagram, an NC lathe 110 has a headstock 113 which can move forward and backward in the same direction as the Z axis, a main spindle 112 rotatably supported by the headstock 113, in which a through hole 112a into which a bar W is inserted along a main spindle axis C is formed, a chuck 117 for holding the bar W, provided at the tip of the main spindle 112, a guide bush 116 provided in front of the headstock 113 (in the left part of FIG. 9), for rotatably supporting the tip of the bar W, and a tool post 114 to which a plurality of tools T are attached.

The tools T attached to the tool post 114 include not only a single point tool for machining the tip of the bar W projected from the guide bush 116 but also a cutting-off tool for cutting off a product formed at the tip of the bar W, and a positioning tool for positioning the bar W on the main spindle axis C by making the tip of the bar W fed from a bar supplying apparatus 120 to be described next come into contact with the tool.

An NC apparatus 115 of the NC lathe 110 controls travel of the headstock 113 and the tool post 114 in accordance with a machining program.

The bar supplying apparatus 120 for feeding the bar W to the NC lathe 110 is disposed rearward of the NC lathe 110 (in the right part of FIG. 9).

The bar supplying apparatus 120 has a not-illustrated bar housing for housing a plurality of bars W, a plurality of bar supporting units 128a, 128b, and 128c each for placing the bar W supplied from the bar housing on the main spindle axis C, and run-out preventing chucks 129a, 129b, and 129c provided for the bar supporting units 128a, 128b, and 128c, respectively, each for holding some midpoint of the bar W so that the long bar W is not bent at the time of machining the tip of the bar W. A similar run-out preventing chuck 129d is also provided on the rear end side of the main spindle 112 of the NC lathe 110.

In the rear part of the bar supplying apparatus 120, a feeder 123 for feeding the bar W placed on the bar supporting units 128a, 128b, and 128c toward the main spindle 112 is provided. At the tip of the feeder 123, a finger chuck 123a which holds the rear end of the bar W and rotates with the bar W is provided.

The feeder 123 is moved forward/backward in the main spindle axis C direction by a driving unit 121 constructed by a motor 121a, a pulley 121b rotated by the driving of the motor 121a, and a belt 121c running around the pulley 121b.

Supply of the bar W from the bar housing, opening/closing of the run-out preventing chucks 129a, 129b, 129c, and 129d, and driving of the motor 121a are controlled by a control unit 125 provided for the bar supplying apparatus 120.

In the bar supplying apparatus 120 having the above configuration, it is necessary to prevent interference between the feeder 123 and the run-out preventing chucks 129a, 129b, 129c, and 129d at the time of feeding the bar W to the main spindle 112 and during the bar W is machined.

For this purpose, before automatic machining is started, the operator manually feeds the feeder 123 in the main spindle axis C direction to position the tip of the feeder 123 at the position 1, 2, 3, or 4 (refer to FIG. 9) before the run-out preventing chuck 129a, 129b, 129c, or 129d, respectively. The position of the feeder 123 at this time is stored in the control unit 125. When the feeder 123 is positioned at the position 1, 2, 3, or 4, the run-out preventing chuck 129a, 129b, 129c, or 129d corresponding to the position is set to be open.

Also, with respect to a timing of cutting the bar W short (which denotes cutting off of the tip portion of the bar having low machine accuracy at the start of machining on the supplied bar) and a timing of replacing the bar W, before the automatic machining is started, the feeder 123 is manually fed so that the tip of the feeder 123 is positioned in the timing position, and the position of the feeder 123 at this time is stored in a memory or the like of the control unit 125.

The flowchart of FIG. 10 shows the procedure of the above-described settings.

At the stage of setting before automatic machining is started, setting is started (step S100) and, simultaneously, a machining program is loaded to the NC apparatus 115 (step 101), and the number of products to be machined and the length of a bar are input (steps S102 and S103). A feed torque according to the length and diameter of the bar W is input to the control unit 125 of the bar supplying apparatus 120 (step S104).

Subsequently, a timing of opening the run-out preventing chucks 129a to 129d is input to the control unit 125 (step S105). As described above, the timing is input by manually feeding the feeder 123 to any of the positions 1 to 4 and inputting the coordinates of the feeder 123 at this time or the like. The positions 1 to 4 have to be determined in consideration of the maximum stroke of the headstock 113 during machining.

Similarly, the positions of the feeder 123 at the timing of replacing the bar W and timing of cutting the tip short are input to the control unit 125 (step 106).

Subsequently, data indicating whether the lengths of the bars W housed in the not illustrated bar housing are the same or not is entered (step S107).

After completion of the inputting operations, data setting is made, input values are stored in the NC apparatus 115 or the memory in the control unit 125 (step S108), and automatic machining is started (step S109).

However, in the conventional bar supplying apparatus 120, the operator has to manually feed the feeder 123 to one of the positions 1 to 4 and enter the coordinates or the like of the feeder 123 in the corresponding position to the control unit 125. Consequently, the work is troublesome and, moreover, there is a problem that long time is required since the bar W is set initially until the automatic machining starts.

The positions 1 to 4 which are set to prevent interference between the run-out preventing chucks 129a to 129d and the feeder 123 have to be determined in consideration of the maximum stroke of the headstock 113 at the time of machining the bar W. The operator has to determine the stoke on the basis of the length of a product and the machining program. It is consequently feared that, due to an improper determination, an unexpected situation such that the feeder 123 collides with the run-out preventing chucks 129a to 129d during machining or at the time of feeding the bar W arises.

The invention has been achieved in consideration of the problems and is to provide a method of controlling a bar supplying apparatus and a numerically controlled lathe which can realize automatic setting of the timing of opening a run-out preventing chuck, the timing of cutting a bar short, and the timing of replacing a bar by the minimum inputting work, shortened inputting and setting time, lessened work burden on the operator, and shortened machining time.

DISCLOSURE OF INVENTION

To solve the problems, the present invention provides a method of controlling a bar supplying apparatus provided for a numerically controlled lathe including: a headstock; a main spindle rotatably supported by the headstock and in which a through hole is formed along an axis; a tool post to which a tool for machining a bar projected from the main spindle through the through hole is attached; and a controller for controlling travel of the headstock or the tool post, and the bar supplying apparatus having a feeder for feeding the bar placed on a bar supporting unit toward the main spindle on a predetermined length unit basis, and a run-out preventing chuck for holding the bar supported on the axis by the bar supporting unit so as not to be run out to the side, wherein position data of the run-out preventing chuck, length data of the bar, length data in the axial direction of a product obtained by machining the bar, and dimensional data of cutting width for cutting the product off from the bar are preset in the controller, and the controller calculates the position of the feeder when the bar is positioned and when the bar is machined by feeder position calculating means and, on the basis of the calculated position of the feeder and each of the preset data, controls supply of the bar to the bar supporting unit, opening/closing of the run-out preventing chuck, and feeding of the bar.

According to the method, by an instruction of the controller of the NC lathe, a bar is supplied from the bar housing to the bar supporting unit. The bar placed on the bar supporting unit is held by the run-out preventing chuck so as not to be bent during automatic machining and when the bar is fed to the main spindle. The controller calculates the position of the feeder when the bar is positioned and when the bar is machined by feeder position calculating means and, and opens the run-out preventing chuck which may interfere with the feeder.

From the length data of a product and the dimensional data of cutting width, how much the bar is consumed by machining one product can be easily determined. The dimensional data of cutting width can be obtained from, for example, the width of a cutting-off tool. Therefore, by subtracting the length of the consumed bar from the original length of the bar, the length data of the machined bar can be obtained.

The length data of a product and the dimensional data of cutting width may be set by manual input of the operator or may be extracted from a machining program for machining a product.

As the feeder position calculating means, a servo mechanism or an encoder may be used. In this case, the position of the feeder can be calculated from the rotation angle of a rotary shaft of a motor, a pulley, or the like provided for the driving unit for moving the feeder.

The tip of the bar supported by the bar supporting unit is detected by detecting means positioned in a predetermined position, and the controller determines the position of the tip of the bar from the position of the feeder at the time when the detecting means detects the tip of the bar, length data of the product extracted from the machining program, and dimensional data of the cutting width, and controls feeding of the bar by the driving unit and opening/closing of the run-out preventing chuck.

In this manner, by the detecting means positioned in the predetermined position for detecting the tip of a bar, without inputting the length of the bar by the operator, the length can be automatically determined. Further, from the length of the bar obtained in the above manner and the position of the feeder detected by the servo mechanism or the like, the position of the tip of the bar can be easily obtained.

By using the servo motor, the feeder can be moved synchronously with movement of the bar in association with machining.

The feeder position calculating means is an arithmetic unit provided for the controller, the tip of the bar fed by the feeder is made come into contact with a contact member positioned in a predetermined position, thereby positioning the bar, and the arithmetic unit may calculate the position of the feeder on the basis of position data of the contact member, length data of the bar, length data of the product, and dimensional data of the cutting width.

According to the method, without using a servo motor or the like, the position of the feeder when the bar is positioned and when the bar is being machined can be obtained.

By making the tip of a bar come into contact with the contact member preliminarily positioned, the position of the tip of the feeder can be calculated from the position of the contact member and the length of the bar. By subtracting the length of a product and the width of a cutting-off tool from the initial length of the bar, the length of the bar after machining can be derived. From the position of the contact member and the length of the bar after machining, the movement amount of the feeder by the machining of the product can be obtained.

Further, the number of products to be machined may be preliminarily input to the controller, and the necessary number of the bars and an expected length of the remaining bar may be calculated on the basis of the number of products to be machined. In this case, whether or not the bar is machined until it is used up may be determined from the expected length of the remaining bar calculated on the basis of the number of products to be machined, from the expected length of the remaining bar calculated on the basis of the number of products to be machined.

A plurality of bars of different lengths are housed in a bar housing for housing the bars, the length data of the bars housed in the bar housing is preliminarily input to the controller, and the bar may be supplied from the bar housing so that expected length of the remaining bar becomes the minimum on the basis of the length data of the product and the number of products to be machined.

According to the method, the bar can be effectively used, and the machining cost can be reduced.

The object of the invention can be also achieved by a numerically controlled lathe having a controller for performing a control according to the control method.

Specifically, there is provided a numerically controlled lathe comprising a headstock, a main spindle rotatably supported by the headstock and in which a through hole is formed along the axis, a tool post to which a tool is attached, and a controller for controlling travel of the headstock or the tool post, wherein the tool of the tool post is provided separately from the numerically controlled lathe, a run-out preventing chuck for holding the bar so as not to be run out to the sides is provided in a preset position, and a bar supplied from a bar supplying apparatus through the through hole in the main spindle is machined by the tool of the tool post, the bar supplying apparatus having a feeder for feeding the bar toward the main spindle on a predetermined length unit basis, and the controller has a function of calculating the position of the feeder when the bar is positioned and when the bar is machined by feeder position calculating means, and controlling supply of the bar to the bar supporting unit, opening/closing of the run-out preventing chuck, and feeding of the bar on the basis of the calculated position of the feeder, length data in the axial direction of a preset product, and dimensional data of cutting width for cutting the product from the bar.

According to the invention, only by inputting the number of products to be machined, the timing of replacing a bar, the timing of cutting a bar short, an amount of feeding a bar, and the timing of opening/closing the run-out preventing chuck can be automatically controlled.

BRIEF DESCRIPTION OF DRAWINGS

FIG. 4 is a diagram showing an example of a setting screen of the bar supplying apparatus displayed on a display of an NC apparatus.

BEST MODE FOR CARRYING OUT THE INVENTION

Preferred embodiments of the invention will be described in detail hereinbelow with reference to the drawings.

First Embodiment

Figure 1:
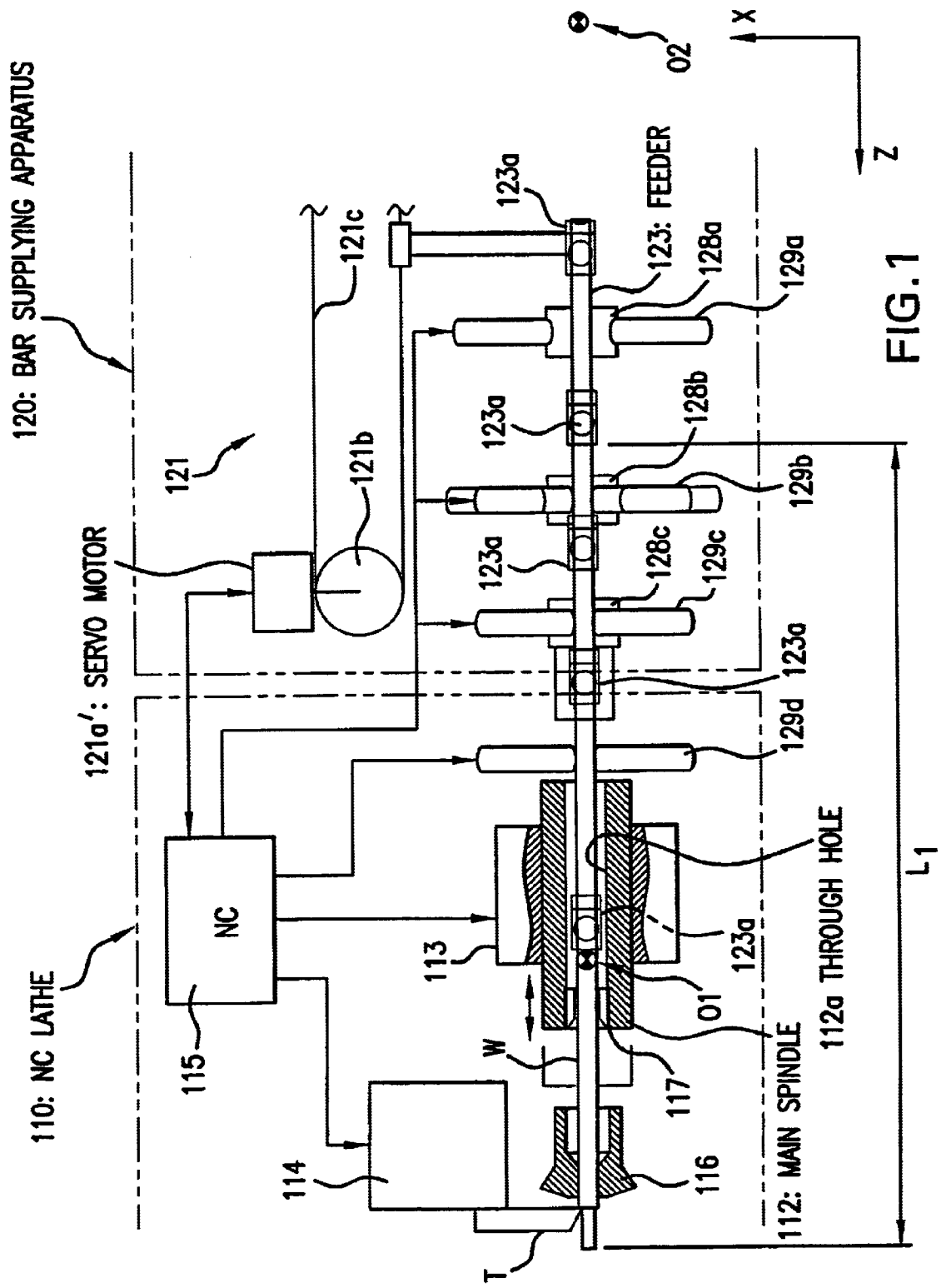
FIG. 1 is a diagram showing a schematic configuration of main components of a numerically controlled lathe having a bar supplying apparatus according to a first embodiment of the invention.
Figure 2:
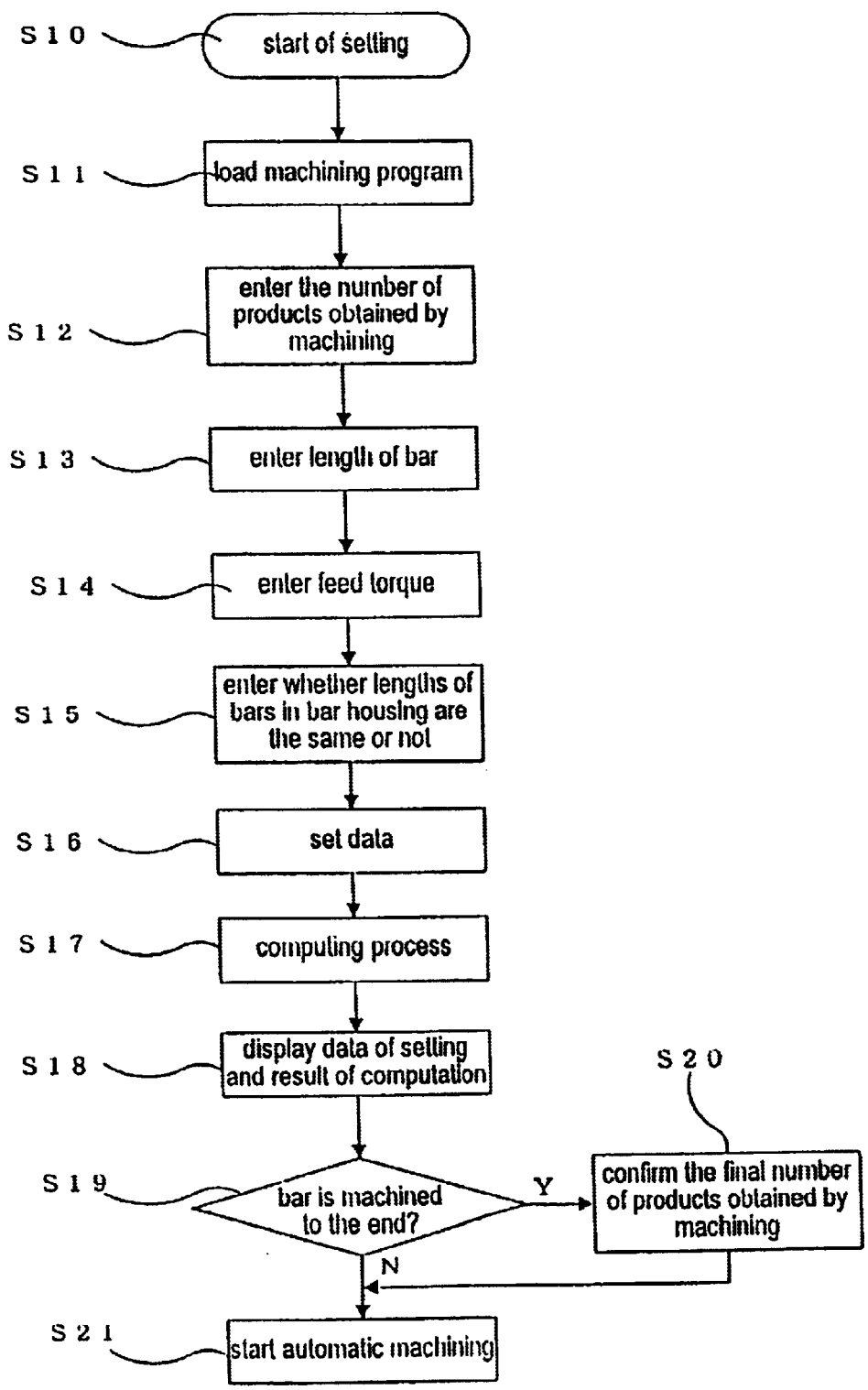
FIG. 2 is a flowchart for explaining a method of controlling the bar supplying apparatus and showing a procedure of setting setting values before automatic machining is started.
Figure 3:
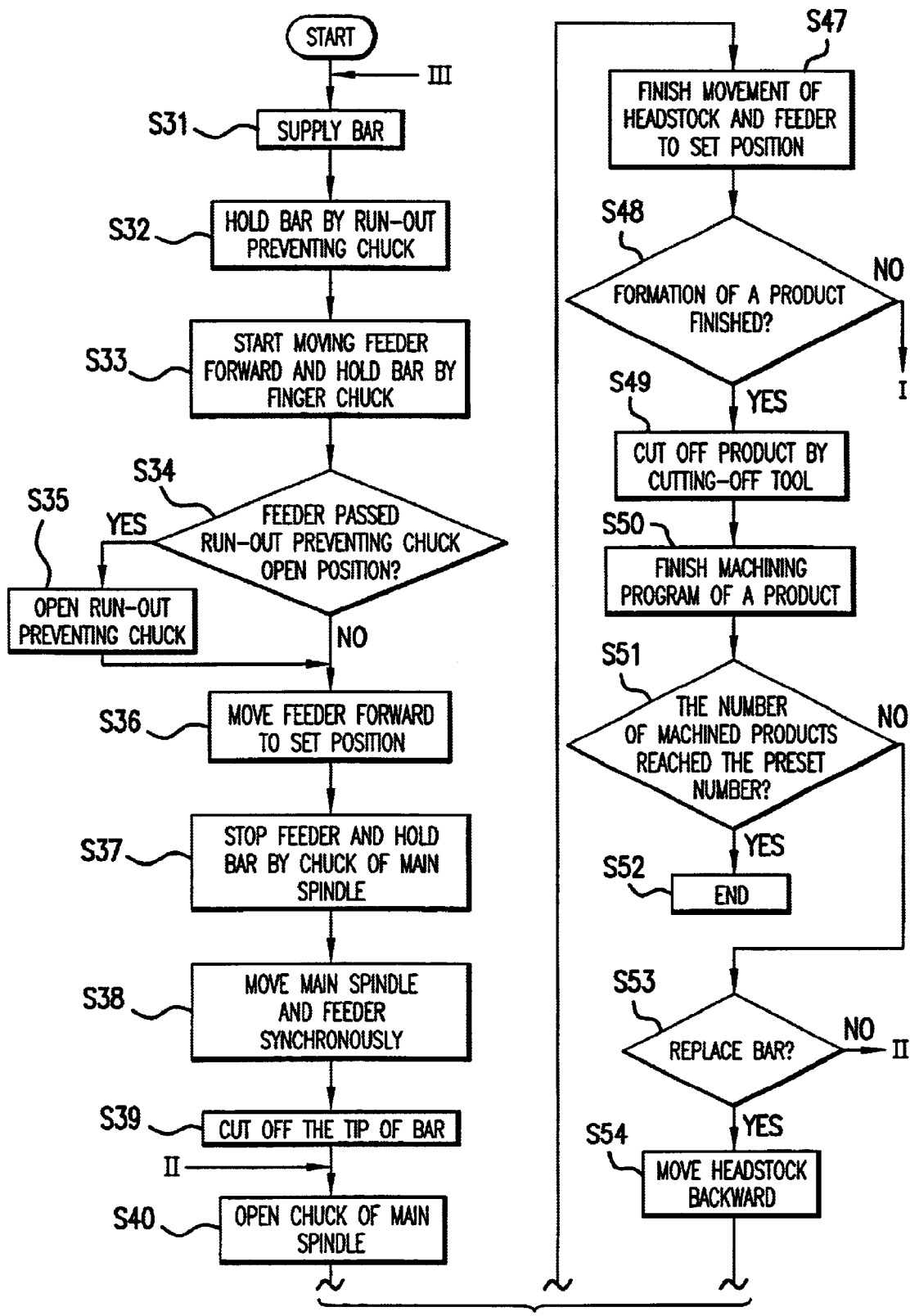
FIG. 3 is a flowchart for explaining a method of controlling the bar supplying apparatus and explaining the bar supplying apparatus after the automatic machining is finished.
Figures 1, 3:
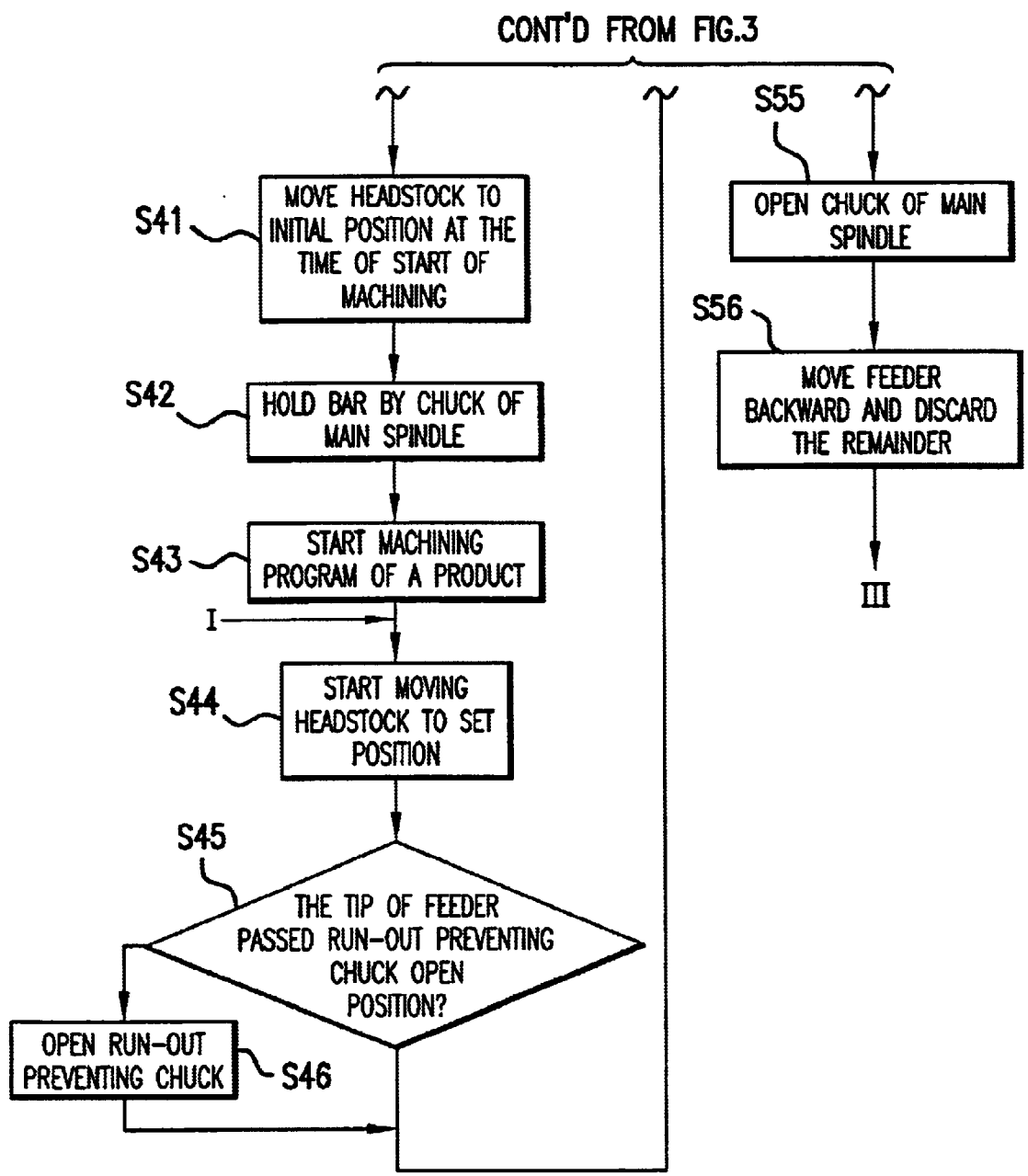

FIG. 1 is a block diagram of a numerically controlled lathe having a bar supplying apparatus, according to a first embodiment of the invention. FIGS. 2 and 3 are flowcharts for explaining a method of controlling the bar supplying apparatus. FIG. 2 shows a procedure of inputting and setting setting values before automatic machining is started, and FIG. 3 is a flowchart for explaining a procedure of controlling the bar supplying apparatus after the automatic machining is started. FIG. 4 is a diagram showing a setup screen displayed on a display at the time of setting various setting values in an NC apparatus. FIG. 5 is a diagram showing the action of a main spindle and a feeder at the time of cutting a bar short.

First, the configuration of an NC lathe and a bar supplying apparatus will be described by referring to FIG. 1.

Figure 9:
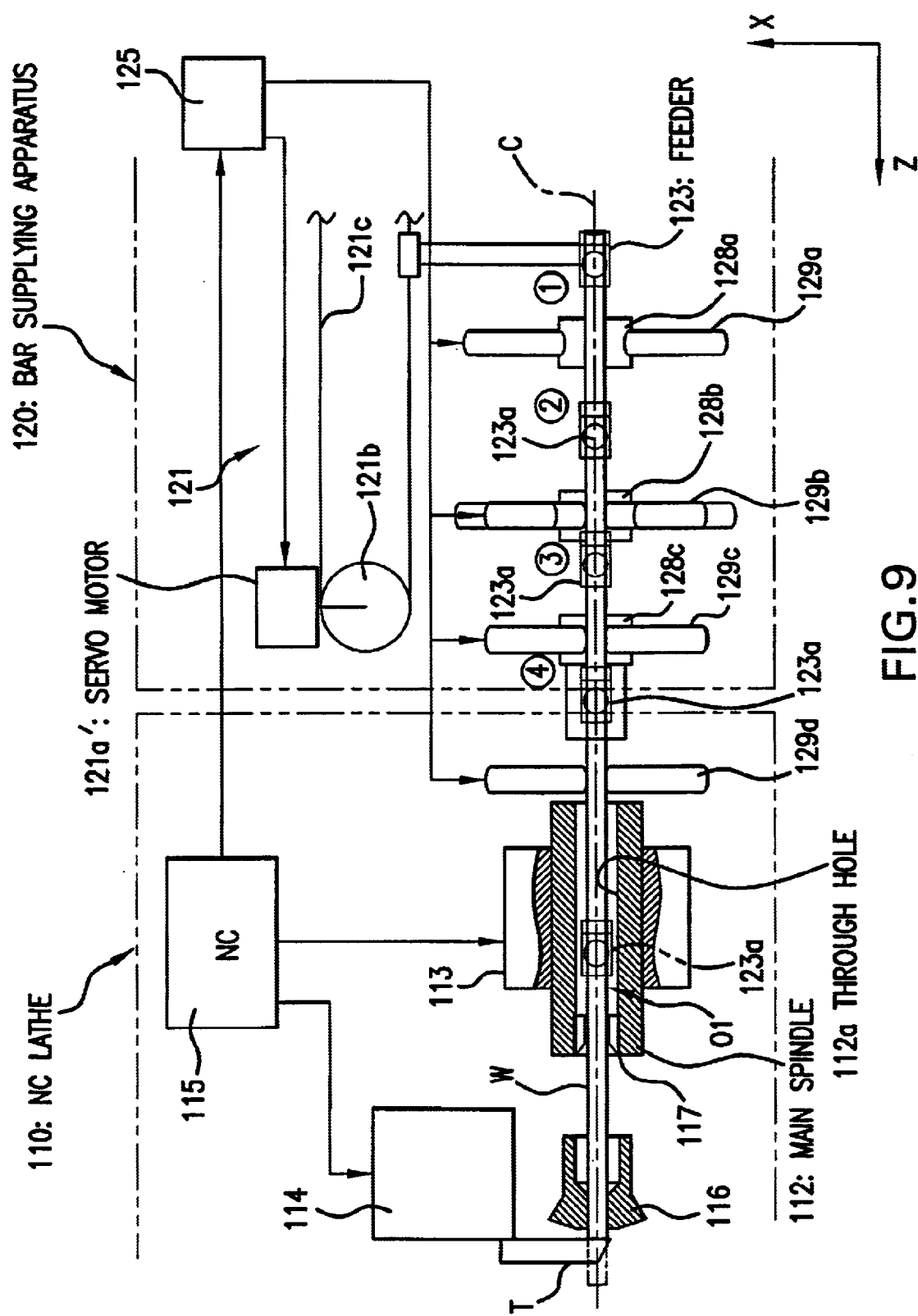
FIG. 9 is a schematic configuration diagram of main components of a numerically controlled lathe having a bar supplying apparatus, as a prior art of the present invention.
Figure 10:
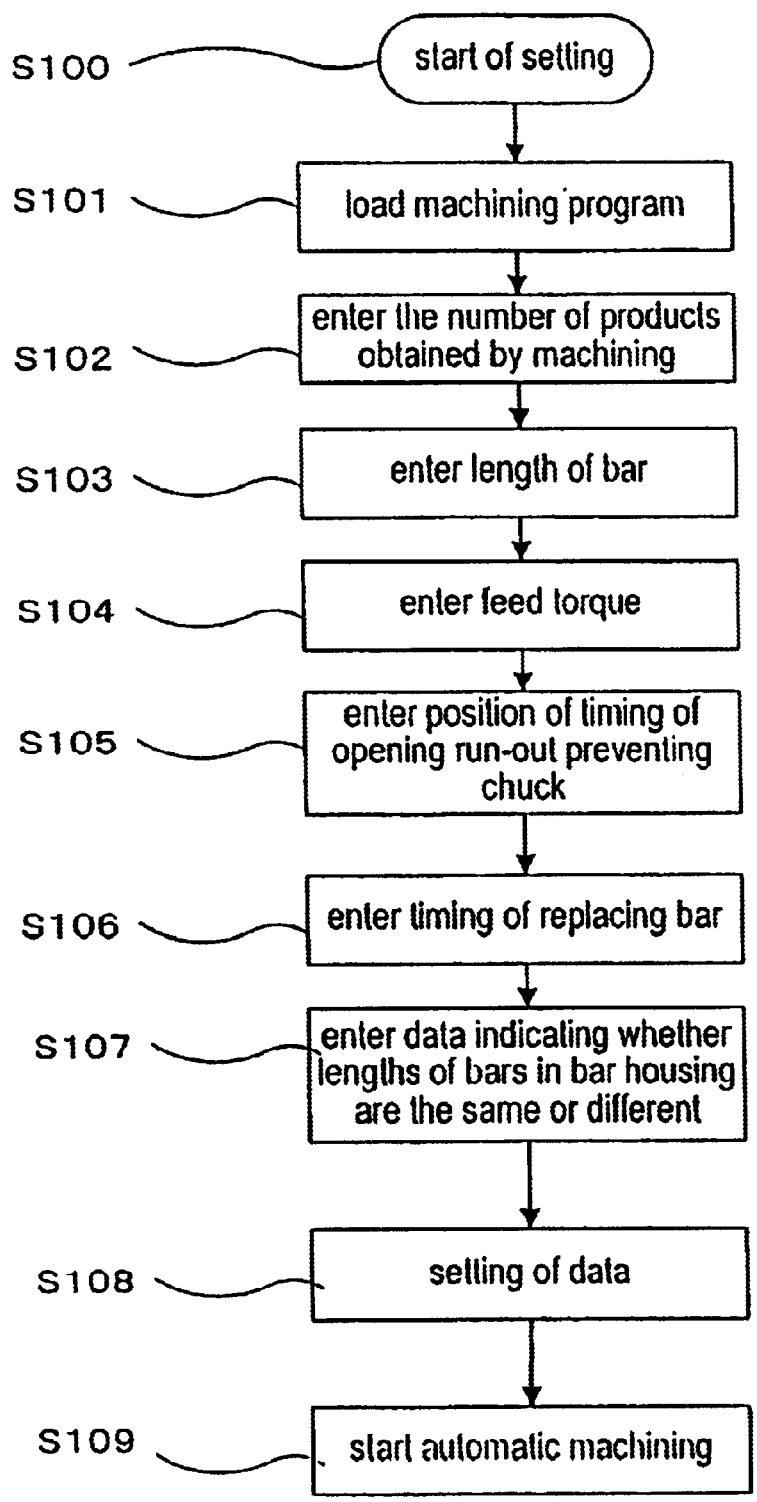
FIG. 10 is a flowchart for explaining a method of controlling a conventional bar supplying apparatus and shows the procedure of setting setting values before automatic machining is started.

The basic configuration of the NC lathe and the bar supplying apparatus of FIG. 1 is the same as that of the NC lathe and the bar supplying apparatus shown in FIG. 9, so that the same parts and same members are designated by the same reference numerals and the detailed description of the parts and members will not be repeated.

In the invention, the NC apparatus 115 of the NC lathe 110 controls supply of the bar W in the bar supplying apparatus 120, driving of a motor for moving the feeder 123, and opening/closing of the run-out preventing chucks 129a to 129d.

In the embodiment, the motor for moving the feeder 123 is a servo motor 121a'. Further, description will be given on condition that the headstock 113 is movable in the Z axis direction and moves forward/backward in accordance with an instruction of the NC apparatus 115.

Procedure of Setting Various Setting Values

Referring to FIGS. 1, 2, and 4, the procedure of setting various setting values will now be described.

In the NC apparatus 115, an initial position O1 of the headstock 113 at the start of machining, an origin position O2 of the feeder 123 in the bar supplying apparatus 120, and the positions of run-out preventing chucks 129a to 129d are preset.

On start of setting (step S10), a machining program is loaded to the NC apparatus 115 (step S11). The operator enters the number of products to be machined and the length of the bar W used for the product machining to the NC apparatus 115 (steps S12 and S13). The operator also enters a feed torque in accordance with the diameter of the bar W or the like (step S14) and enters data indicating whether the lengths of the bars W housed in a not-illustrated bar housing are the same or not (step S15).

The length of a product and the width of a cutting-off tool as dimension data of a width of cutting may be manually entered by the operator in step S13 or can be automatically read from the machining program.

After completion of the inputting operation, data setting is made and input values are stored in a memory in the NC apparatus 115 (step S16). On the basis of the set data, the NC apparatus 115 computes the length of the bar W consumed by machining one product (which is equal to the sum of the product length and the width of the cutting-off tool), the timing of opening the run-out preventing chucks 129a to 29d, the number of necessary bars, the length of the remaining bar W after the necessary number of products are machined, the number of machining times which can be performed until the bar is used up, the timing of replacing the bar W, and the like (step S17). The computation results are displayed on a setup screen 130 of the display of the NC apparatus 115 as shown in FIG. 4 (step S18). The operator can confirm whether the contents of the settings are correct or not on the setup screen 130.

The operator determines whether the products are machined until the bar W is used up on the basis of the number of machining times which can be performed and is calculated by the NC apparatus 115 (step S19). In the case where the machining is performed until the bar W is used up, the final number of products to be machined is confirmed on the setup screen 130 (step S20). After completion of the above, automatic machining is started (step S21).

Procedure of Automatic Machining

The procedure of the automatic machining will now be described with reference to FIGS. 1, 3, and 5.

When the automatic machine is started, the NC apparatus 115 outputs an instruction to take out the bar W from the not-illustrated bar housing and supply it to the bar supporting units 128a to 128c (step S31). When the bar W is supplied to the bar supporting units 128a to 128c, the run-out preventing chucks 129a to 129d are closed to hold the bar W (step S32).

Subsequently, the NC apparatus 115 drives the servo motor 121a' to start forward movement of the feeder 123. By the forward movement of the feeder 123, an end portion of the bar W is grasped by the finger chuck 123a of the feeder 123. After that, the bar W moves together with the feeder 123 (step S33, refer to FIG. 5A).

The position of the tip of the feeder 123 is determined by the NC apparatus 115 from the rotation angle of the rotary shaft of the servo motor 121a'. The NC apparatus 115 determines whether or not the feeder 123 reaches a position at which any of the preset run-out preventing chucks 129a to 129d is open (step S34). When it is determined that the feeder 123 reaches the open position, the NC apparatus 115 outputs an instruction to open the run-out preventing chuck corresponding to the open position (step S35).

The dimensional accuracy and machining accuracy of the tip portion of the bar W supplied from the bar housing are often low. Consequently, before the machining on a product is started, the tip portion of the bar W having low machining accuracy has to be preliminarily cut off by a cutting-off tool. To do this work, the NC apparatus 115 allows the feeder 123 to travel forward so that the tip of the bar W reaches a preset position in the guide bush 116 (step S36, refer to FIG. 5B).

The tip position of the bar W can be obtained by adding initial length $L_0$ of the bar W to the position of the feeder 123.

When the tip of the bar W reaches the preset position, the NC apparatus 115 stops the driving of the servo motor 121a', thereby stopping the movement of the feeder 123. The NC apparatus 115 drives chuck 117 of the main spindle 112 so as to grasp the bar W (step S37).

Figure 5A:
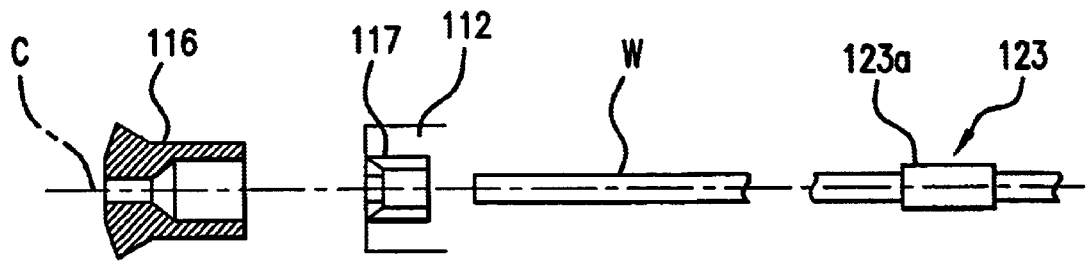
FIG. 5 is a diagram showing the relation of a main spindle and a feeder at the time of cutting a bar short.
Figure 5B:
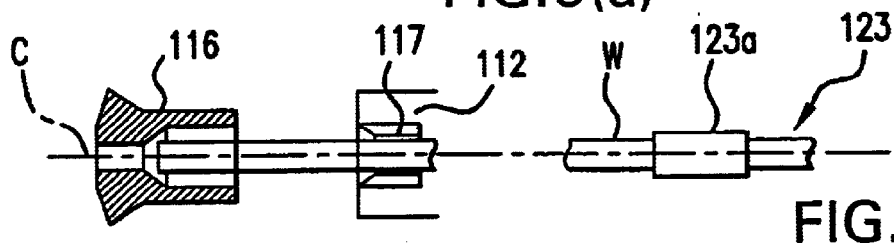
Figure 5C:
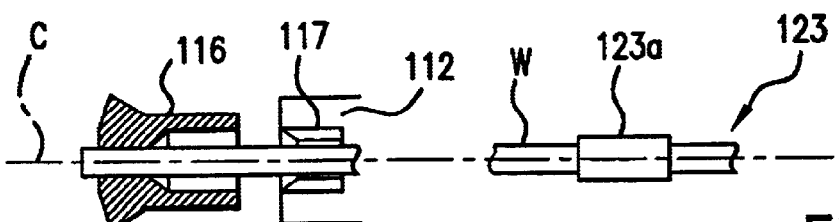
Figure 5D:
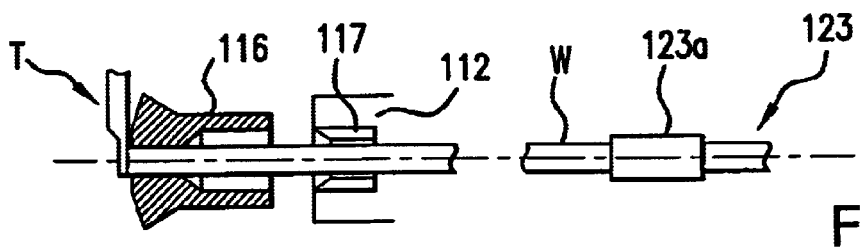

Subsequently, the headstock 113 and the feeder 123 are moved synchronously (step S38) to make the tip of the bar W project from the guide bush 116 only by a preset length (refer to FIG. 5C). The cutting-off tool (indicated by reference numeral T1 in FIG. 5) attached to the tool post 114 cuts off the tip of a work W only by a preset length (step S39, refer to FIG. 5D). The length of the bar W after the tip is cut off is referred to as $L_1$. In this step, the tool is not limited to the cutting-off tool but the tip of the work W may be subjected to end face machining only by a preset length by a tool for machining an end face.

Figure 5E:
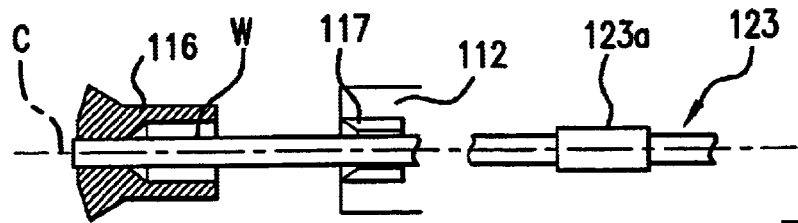
Figure 5F:
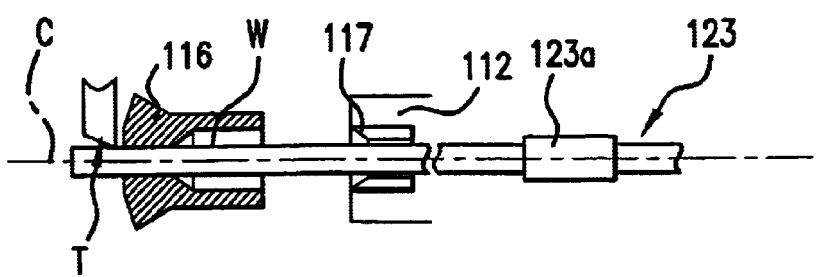

After the procedure is finished, the NC apparatus 115 opens the chuck 117, thereby canceling the grasp of the bar W by the chuck 117 (step S40) and moves the headstock 113 to the initial position O1 at the time of start of the machining (step S41, refer to FIG. 5E). Since the feeder 123 does not move at this time, the position of the bar W is maintained at the position at which the tip of the bar W was cut off. After the headstock 113 moves to the initial position O1, the NC apparatus 115 drives the chuck 117 so as to grasp the bar W (step S42).

After that, a machining program for machining one product is started (step S43). While synchronously moving the headstock 113 and feeder 123 in the Z axis direction, the machining on the bar W with a tool is started (step S44, refer to FIG. 5F. In FIG. 5, this tool is indicated by a reference numeral T2). In a process of moving the headstock 113 and feeder 123 in the Z axis direction, whether the tip of the feeder 123 reaches the open position of any of the preset run-out preventing chucks 1129a, 129b, 129c, and 129d is always monitored (step S45). When the tip of the feeder 123 reaches the open position, the NC apparatus 115 outputs an instruction to open the run-out preventing chuck corresponding to the open position (step S46).

When the headstock 113 and feeder 123 come to a preset position while synchronously moving (step S47), whether formation of one product has been finished or not is determined (step S48). If it is not finished, the program returns to step 44, and the machining is continued.

If formation of one product is finished, the product is cut off from the bar W by the cutting-off tool (step S49) and the machining program for machining one product is finished (step S50). The length of the bar W at this time is equal to a length obtained by subtracting the length "l" of the product and the width "s" of the cutting-off tool from the length $L_1$ on start of the machining (the length is indicated by $L_2$ which is expressed by the equation of $L_2=L_1-(l+s)$. Hereinbelow, the length of the remaining bar W after "k" products are machined is expressed by $L_{k+1}$ which is similarly $L_{k+1}=L_k-(l+s)$).

The NC apparatus 115 counts the number of machined products and determines whether the number reaches the preset number or not (step S51). When the number of machined products reaches the preset number, the machining is finished (step S52).

If the number of machined products has not reached the preset number, whether the bar W is replaced or not is determined on the basis of the length $L_{k+1}$ of the remaining bar W (step S53). Whether the bar W is to be replaced or not may be determined by comparing the preset value with the length $L_{k+1}$ of the remainder and determining whether the length $L_{k+1}$ of the remainder is smaller than the preset value or not. When the following product is machined from the product W having the length of $L_{k+1}$ of the remainder, whether the bar W is replaced or not may be determined by seeing whether the main spindle 112 and feeder 123 interfere with the guide bush 116 and chuck 117.

When it is determined that the bar W does not have to be replaced, the program returns to step S40 and machining on the next product is started.

When it is determined that the bar W has to be replaced, the headstock 113 and feeder 123 are moved backward (step S54), the grasp of the bar W by the chuck 117 is canceled (step S55), the feeder 123 is further moved backward and the remaining material is discarded (step S56). After that, the program returns to step S31 and the subsequent steps are repeated.

Second Embodiment

A second embodiment of the invention will now be described by referring to FIGS. 6 and 7.

According to the idea of the present invention, as a motor for moving the feeder 123, a motor which does not have a servo mechanism or an encoder can be also applied.

In the second embodiment, the motor 121a for moving the feeder 123 is an ordinary motor which does not have the servo mechanism or the like. To the tool post 114, a tool T for positioning as a contact member with which the tip of the bar W supplied is made come into contact, thereby positioning the bar W is attached. As the tool T for positioning, a tool which can position the bar W by making the tip of the bar W contact with the tool is sufficient. Not only a dedicated positioning tool but also a tool used for other use such as a cutting-off tool or a cutting tool may be used.

The procedure of automatic machining in the numerically controlled lathe having the above configuration will be described with reference to the flowchart of FIG. 7.

When the bar W is supplied from a not-illustrated bar housing to the bar supporting units 128a to 128c (step S61), the run-out preventing chucks 129a to 129d are closed to grasp the bar W (step S62).

Figure 6:
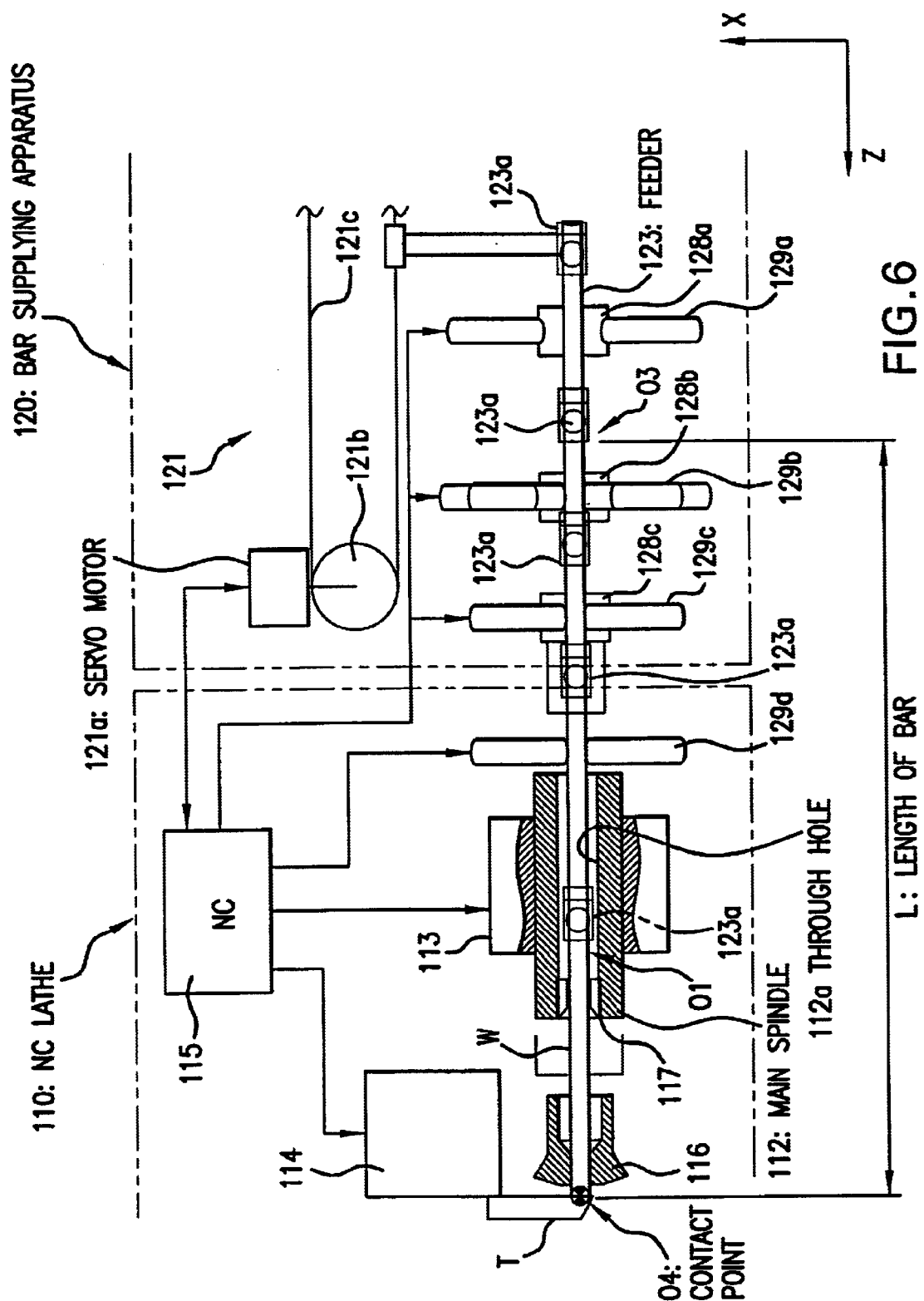
FIG. 6 is a diagram schematically showing the configuration of main components of a numerically controlled lathe having a bar supplying apparatus according to a second embodiment of the invention.
Figure 7:
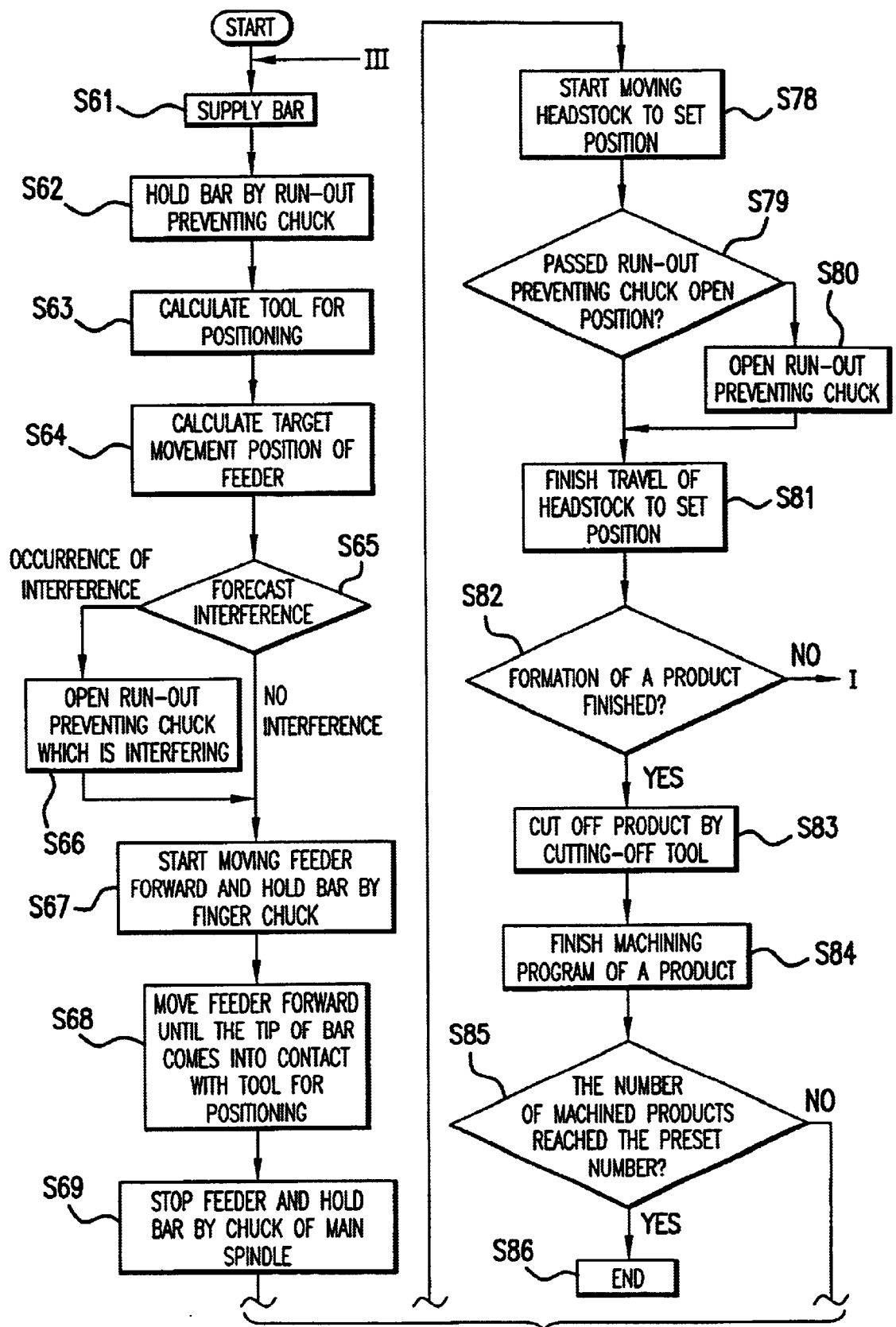
FIG. 7 is a flowchart for explaining a method of controlling the bar supplying apparatus and explaining a procedure of controlling the bar supplying apparatus after automatic machining is started.
Figures 1, 7:
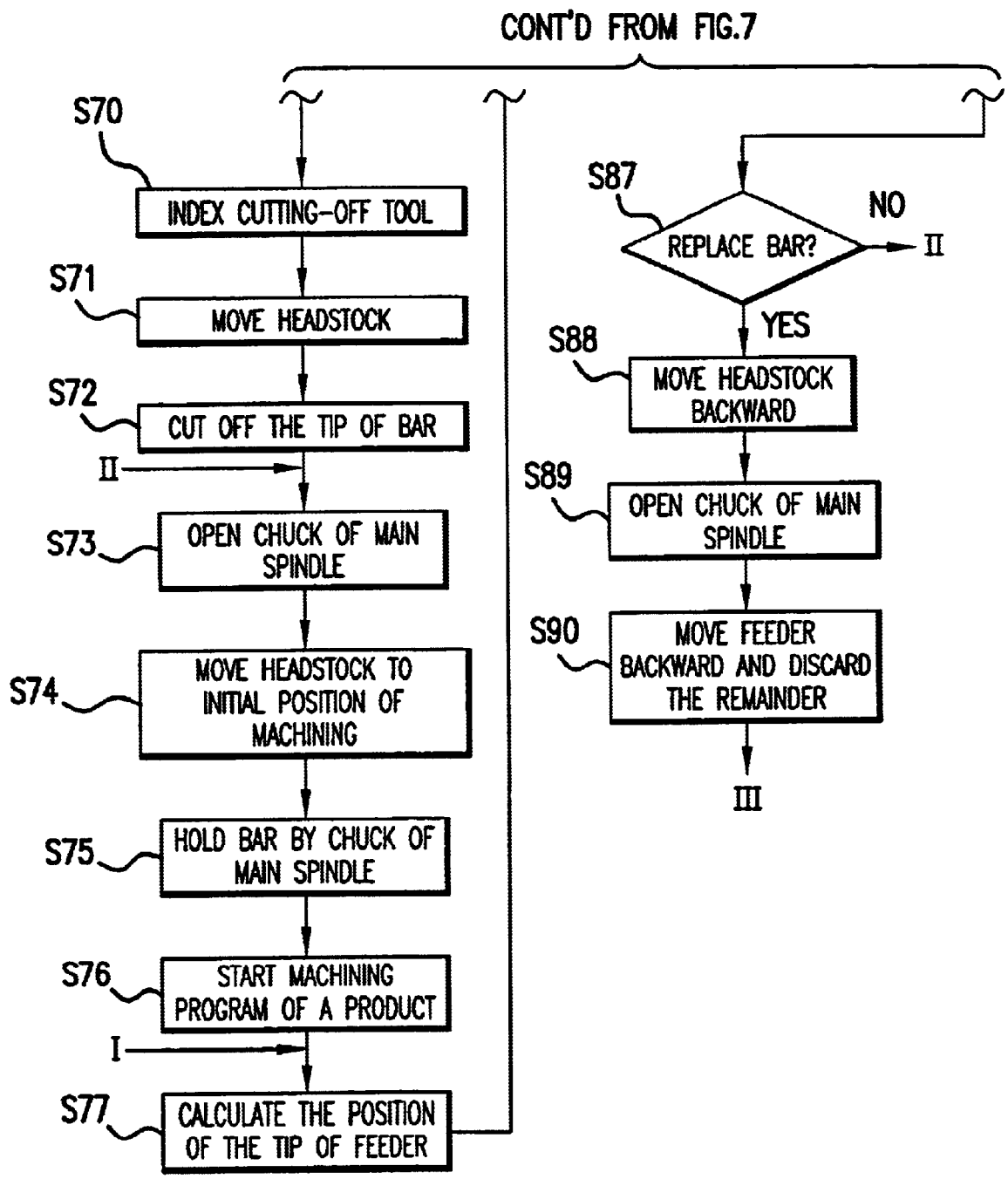

The tool post 114 indexes the tool T for positioning in a predetermined position so that the tool T is positioned in a preset position in front of the guide bush 115 (step S63, refer to FIG. 6). Subsequently, from the (preset) length of the bar W supplied and the position of a contact point O4 (refer to FIG. 6) at which the tip of the bar W comes into contact with the tool T, the NC apparatus 115 obtains a movement target position O3 of the feeder 123 (step 64). The movement target position O3 can be obtained by, as shown in FIG. 6, subtracting the length L of the bar W from the position of the contact point O4.

The NC apparatus 115 determines whether or not any of the run-out preventing chucks 129a to 129d exists in the movement path of the feeder 123 extending to the movement target position O3 (step S65). When a run-out preventing chuck which may interfere with the feeder 123 during the movement exists, the run-out preventing chuck is opened (step S66).

After that, the motor 121a is driven to move the feeder 123 forward. At this time, the rear end of the bar W is grasped by the finger chuck 123a of the feeder 123 (step S67).

When the tip of the bar W passes through the main spindle 112 and the guide bush 116 and comes into contact with the tool T for positioning (step S68), the forward travel of the bar W and feeder 123 is regulated and an overload acts on the motor 121a. In response to the overload, the NC apparatus 115 stops the motor 121a and drives the chuck 117 to grasp the bar W (step S69). After that, the tool post 114 indexes the cutting-off tool to a predetermined position.

When the tip of the bar W is made come into contact with the tool T of positioning, if the bar W is pushed back from the tool T for positioning by repulsion acting on the bar W and it becomes difficult to precisely position the bar W, after the motor 121a is stopped and before the chuck 117 grasps the bar W, the tool T for positioning is moved to the bar W side to make the bar W come into contact with the tool T so as to push the bar W slightly backward.

Subsequently, the tool T for positioning is escaped from the contact point O4 to move the headstock 113 forward by a predetermined amount (step S71) so that the length of the bar W projected from the guide bush 116 becomes equal to a preset value. The cutting-off tool attached to the tool post 114 cuts the tip of the work W only by the preset length (step S72).

After completion of the procedure, the NC apparatus 115 cancels the grasp of the bar W by the chuck 117 (step S73) and moves the headstock 113 to the initial position O1 at the time of start of the machining (step S74). After that, the NC apparatus 115 drives the chuck 117 so as to grasp the bar W (step S75).

Subsequently, a machining program for machining a product is started (step S76). The tip position of the feeder 123 can be obtained by adding the travel distance of the headstock 113 to the tip position (corresponding to the movement target position O3) of the feeder 123 at the time when the tip of the bar W comes into contact with the tool T for positioning (step S77). While moving the headstock 113 in the Z axis direction, the machining on the bar W is started (step S78). During the machining on the bar W, the feeder 123 travels in the Z axis direction so as to follow the travel of the bar W in association with the movement of the headstock 113.

During the travel of the feeder 123 in the Z axis direction with the bar W, whether or not the tip of the feeder 123 comes to the open position of any of the preset run-out preventing chucks 129a to 129d is determined (step S79). When any of the run-out preventing chucks comes to the open position, the NC apparatus 115 outputs an instruction to open the run-out preventing chuck corresponding to the open position (step S80).

When the headstock 113 and feeder 123 travel and come to the preset position (step S81), whether formation of one product is finished or not is determined (step S82). If it is not finished, the program returns to step S77 and the machining is continued.

If the formation of one product is finished, the product is cut off from the bar W by the cutting-off tool (step S83). After that, the machining program for machining one product is finished (step S84).

The NC apparatus 115 counts the number of machined products and determines whether the number has reached the preset number or not (step S85). If the number reaches the preset number, the machining is finished (step S86).

If the number has not reached the preset number, whether the bar W is replaced or not is determined on the basis of the length $L_{k+1}$ of the remaining bar W (step S87).

When it is determined that the bar W does not have to be replaced, the program returns to step S73 and starts machining on the following product.

When it is determined that the bar W has to be replaced, the headstock 113 and the feeder 123 are moved backward (step S88). The grasp of the bar W by the chuck 117 is canceled (step S89), the feeder 123 is moved further backward, and the remained material is discarded (step S90).

Third Embodiment

A third embodiment of the invention will now be described by referring to FIG. 8.

Figure 8:
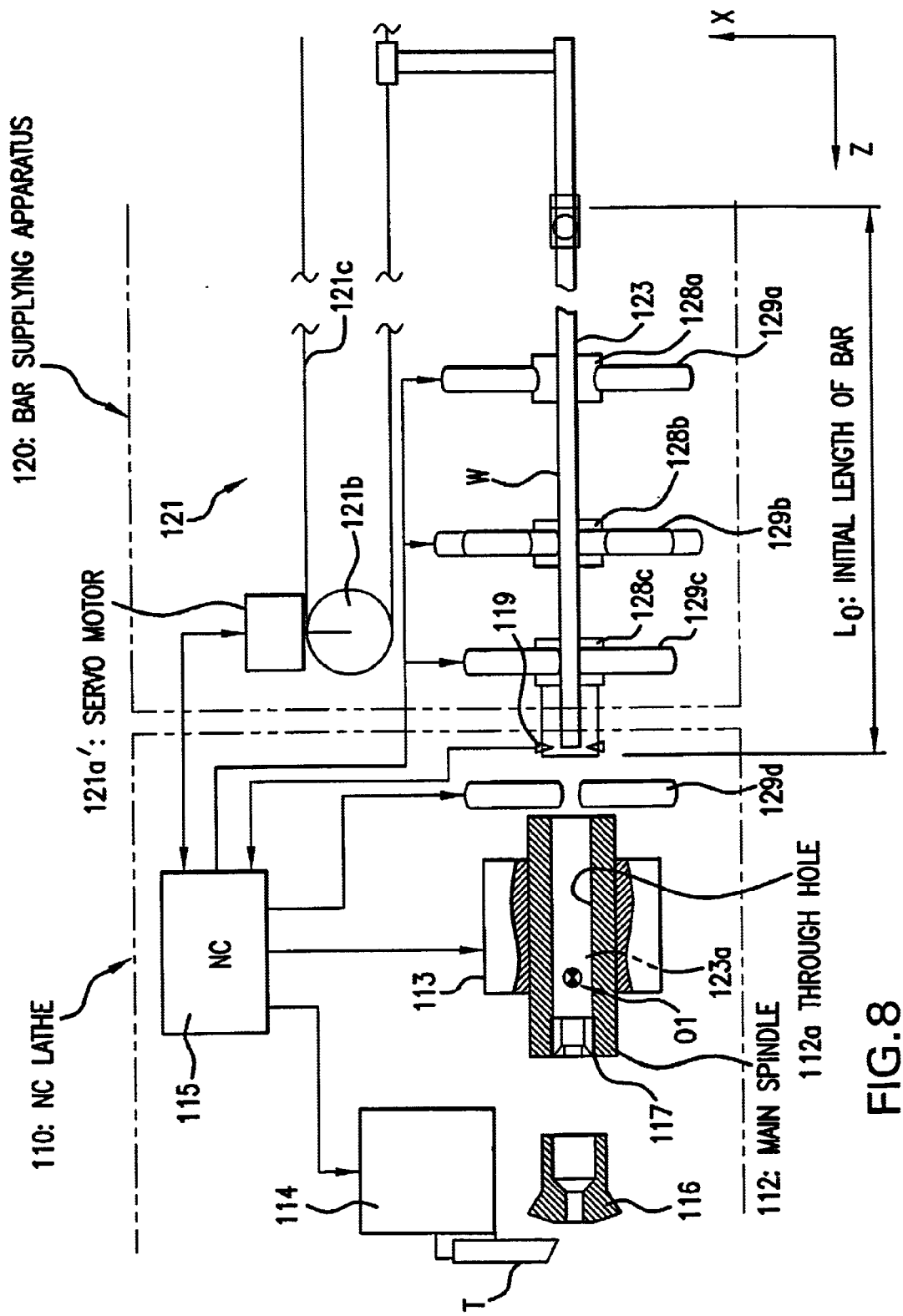
FIG. 8 is a schematic configuration diagram of main components of a numerically controlled lathe having a bar supplying apparatus, according to a third embodiment of the invention.

In FIG. 8, the same parts and the same members as those in FIG. 1 of the first embodiment are designated by the same reference numerals and their detailed description will not be repeated.

In the embodiment, an optoelectronic sensor 119 for detecting the tip of the bar W is positioned and provided in front of the run-out preventing chuck 129c of the bar supplying apparatus 120.

In the embodiment, a motor for moving the feeder 123 is the servo motor 121a' similar to that of the first embodiment.

When the tip of the bar W crosses in front of the optoelectronic sensor 119, a detection signal is transmitted from the optoelectronic sensor 119 to the NC apparatus 115. The NC apparatus 115 determines the position of the feeder 123 at the time point when the detection is input on the basis of the rotation angle of the rotary shaft of the servo motor 121a', and calculates the initial length $L_0$ of the bar W supplied to the bar supporting units 128a to 128c from the position of the feeder 123 and the preset position of the optoelectronic sensor 119.

As described above, according to the embodiment, the operator does not have to enter the accurate length of the bar W, so that the operator does not accurately grasp the length of the bar W. Therefore, the burden on the operator can be further lessened, and the machining time can be further shortened.

There is also an advantage that occurrence of a trouble due to an erroneous input of the length of the bar W can be prevented.

Further, the length of the bar W can be accurately determined, so that bars W of different lengths can be supplied at random.

At the time of discarding the bar W as a remainder, by moving the feeder 123 backward until the optoelectronic sensor 119 detects the tip of the bar W, the length of the remaining bar W can be known. In such a manner, the bars W can be classified by length of the remainder and housed in the bar housing.

Although the preferred embodiments of the invention have been described, the invention is not limited to the foregoing embodiments.

For example, in the third embodiment, a sensor for detecting the tip of the bar is described as an optoelectronic sensor. However, the invention is not limited to the optoelectronic sensor but other sensor or switch such as a proximity switch may be used as long as the other sensor or switch can detect passage of the tip of a bar at a certain point.

According to the invention, it is also possible to prepare a plurality of bars W of different lengths in the bar housing so as to be classified and the NC apparatus 115 can obtain a combination of the bars W of different lengths so that the length of the final remained bar W becomes the minimum on the basis of the length of the bar W housed in the bar housing, the number of machined products, the length data of the product, and the dimensional data of the cutting width.

By supplying the bar W in accordance with the obtained combination, efficient machining with a small remainder to be discarded can be performed.

According to the invention, the timing of opening the run-out preventing chuck, the timing of cutting the bar short, and the timing of replacing the bar can be automatically set by the minimum input work. Therefore, input and setting time can be shortened, the work load on the operator is lessened, and the machining time can be shortened.

Industrial Applicability

The invention can be applied not only to a numerically controlled lathe having a movable headstock but also to a numerically controlled lathe having a fixed headstock. The invention can be applied not only to a numerically controlled lathe for cutting a bar with a cutting-off tool but also to a numerically controlled lathe for cutting a bar with a laser beam, a water jet, a wire-cut electric discharge machining, or the like.

What is claimed is:

1. A method of controlling a bar supplying apparatus provided for a numerically controlled lathe comprising: a headstock; a main spindle rotatably supported by the headstock and in which a through hole is formed along an axis; a tool post to which a tool for machining a bar projected from said main spindle through said through hole is attached; and a controller for controlling travel of said headstock or said tool post, and the bar supplying apparatus having a feeder for feeding said bar placed on a bar supporting unit toward said main spindle on a predetermined length unit basis, and a run-out preventing chuck for holding said bar supported on said axis by said bar supporting unit so as not to be run out to the side, characterized in that position data of said run-out preventing chuck, length data of said bar, length data in the axial direction of a product obtained by machining said bar, and dimensional data of cutting width for cutting said product off from said bar are preset in said controller, and said controller calculates the position of said feeder when said bar is positioned and when said bar is machined by feeder position calculating means and, on the basis of the calculated position of said feeder and each of said preset data, controls supply of said bar to said bar supporting unit, opening/closing of said run-out preventing chuck, and feeding of said bar.

2. The method of controlling the bar supplying apparatus in the numerically controlled lathe according to claim 1, characterized in that said feeder position calculating means is a servo mechanism or an encoder provided for a driving unit for driving said feeder, and said controller calculates the position of said feeder from a rotation angle of a rotary shaft provided for said driving unit.

3. The method of controlling the bar supplying apparatus in the numerically controlled lathe according to claim 2, characterized in that the tip of said bar supported by said bar supporting unit is detected by detecting means positioned in a predetermined position, and said controller determines the position of the tip of said bar from the position of said feeder at the time when said detecting means detects the tip of said bar, length data of said product extracted from said machining program, and dimensional data of said cutting width, and controls feeding of said bar by said driving unit and opening/closing of said run-out preventing chuck.

4. The method of controlling the bar supplying apparatus in the numerically controlled lathe according to claim 2, characterized in that said feeder is moved synchronously with movement of said bar in association with maching.

5. The method of controlling the bar supplying apparatus in the numerically controlled lathe according to claim 1, characterized in that said feeder position calculating means is an arithmetic unit provided for said controller, the tip of the bar fed by said feeder is made come into contact with a contact member positioned in a predetermined position, thereby positioning the bar, and said arithmetic unit calculates the position of said feeder on the basis of position data of said contact member, length data of said bar, length data of said product, and dimensional data of said cutting width.

6. The method of controlling the bar supplying apparatus in the numerically controlled lathe according to claim 1, characterized in that the number of products to be machined is preliminarily input to said controller, and the necessary number of said bars and an expected length of said remaining bar are calculated on the basis of the number of products to be machined.

7. The method of controlling the bar supplying apparatus in the numerically controlled lathe according to claim 6, characterized in that whether or not said bar is machined until it is used up is determined from the expected length of said remaining bar calculated on the basis of said number of products to be machined.

8. The method of controlling the bar supplying apparatus in the numerically controlled lathe according to claim 1, characterized in that a plurality of bars of different lengths are housed in a bar housing for housing said bars, the length data of said bars housed in said bar housing is preliminarily input to said controller, and said bar is supplied from said bar housing so that expected length of said remaining bar becomes the minimum on the basis of the length data of said product and the number of products to be machined.

9. The method of controlling the bar supplying apparatus in the numerically controlled lathe according to claim 1, characterized in that the dimensional data of said cutting width is based on the width of a cutting-off tool.

10. A numerically controlled lathe comprising a headstock, a main spindle rotatably supported by the headstock and in which a through hole is formed along the axis, a tool post to which a tool is attached, and a controller for controlling travel of said headstock or said tool post, characterized in that the tool of said tool post is provided separately from said numerically controlled lathe, a run-out preventing chuck for holding said bar so as not to be run out to the sides is provided in a preset position, and a bar supplied from a bar supplying apparatus through the through hole in said main spindle is machined by the tool of said tool post, the bar supplying apparatus having a feeder for feeding said bar toward said main spindle on a predetermined length unit basis, and said controller has a function of calculating the position of said feeder when said bar is positioned and when said bar is machined by feeder position calculating means, and controlling supply of said bar to said bar supporting unit, opening/closing of said run-out preventing chuck, and feeding of said bar on the basis of the calculated position of said feeder, length data in the axial direction of a preset product, and dimensional data of cutting width for cutting said product from said bar.

11. The numerically controlled lathe according to claim 10, characterized in that said feeder position calculating means is a servo mechanism or an encoder provided for a driving unit for moving said feeder, and said controller calculates the position of said feeder on the basis of a rotation angle of a rotary shaft provided for said driving unit.

12. The numerically controlled lathe according to claim 10, characterized in that said feeder position calculating means is an arithmetic unit provided for said controller, the tip of the bar fed by said feeder is made come into contact with a contact member positioned in a predetermined position, thereby positioning the bar, and said arithmetic unit calculates the position of said feeder on the basis of position data of said contact member, length data of said bar, length data of said product, and dimensional data of said cutting width.

13. The numerically controlled lathe according to claim 10, characterized in that the dimensional data of said cutting width is based on the width of a cutting-off tool.

* * * * *